Nov. 17, 1925.  
R. H. GILKERSON  
ANTIGLARE DEVICE OR EYESHIELD  
Filed Nov. 24, 1924

1,562,086

Inventor  
Roland H. Gilkerson

Patented Nov. 17, 1925.

1,562,086

UNITED STATES PATENT OFFICE.

ROLAND H. GILKERSON, OF WATERTOWN, WISCONSIN, ASSIGNOR OF ONE-HALF TO VONESS D. CHIPMAN, OF WATERTOWN, WISCONSIN.

ANTIGLARE DEVICE OR EYESHIELD.

Application filed November 24, 1924. Serial No. 752,029.

*To all whom it may concern:*

Be it known that I, ROLAND H. GILKERSON, a citizen of the United States, and resident of Watertown, in the county of Jefferson and State of Wisconsin, have invented certain new and useful Improvements in Antiglare Devices or Eyeshields; and I do hereby declare that the following is a full, clear, and exact description thereof.

This invention relates to anti-glare devices or eye shields.

Objects of this invention are to provide an eye shield which may be quickly positioned over a conventional pair of eye glasses of any of the usual types whether provided with temples or with nose clips, and to provide a device of this type which will adapt itself to any of the usual types of spectacles or eye glasses in an automatic manner and will retain itself snugly in place.

Further objects are to provide an eye shield which may be constructed in a very cheap and simple manner, which will conform to the contour of the glasses, which is substantially flat and may be readily carried without requiring a large space, and which, when in position upon the glasses, is inconspicuous and does not detract from the appearance of the eye glasses.

An embodiment of the invention is shown in the accompanying drawings, in which:—

Referring in detail to the drawings, it will be seen that the eye shield comprises a pair of transparent members 1 and 2 which are of identical construction and similarly contoured. These members are preferably formed from colored celluloid, although obviously other material may be used, although celluloid is preferable on account of its flexibility and cheapness.

Figure 3:
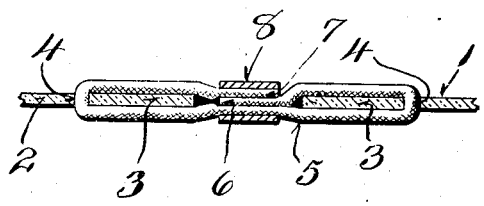
Figure 3 is an enlarged sectional view on the line 3—3 of Figure 1.

The members are each provided with inwardly projecting portions 3 which are provided with apertures 4, as is more clearly shown in Figure 3. An elastic tape 5 is threaded through these apertures and has its ends overlapping, as indicated at 6 and 7.

A small metal clip 8 encloses the central portion of the elastic strap or loop and is tightly bound thereon to hold the overlapping ends of the loop in position in a simple and efficacious manner.

Figure 1:
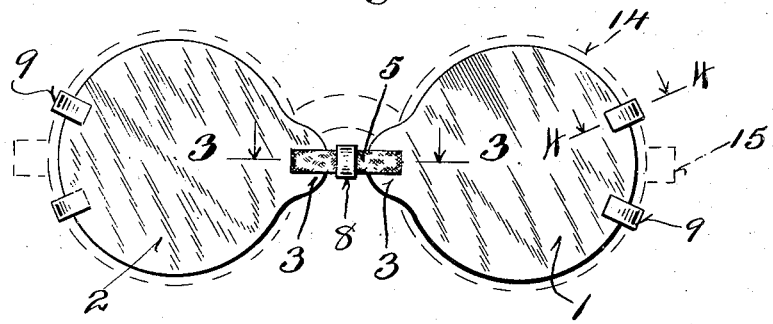
Figure 1 is a front view of the device showing in dotted lines a pair of spectacles.
Figure 2:
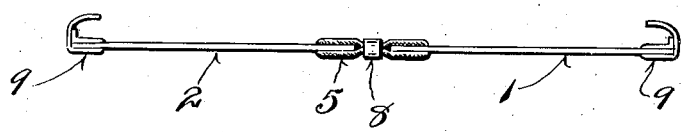
Figure 2 is an edge view of the device.
Figure 4:
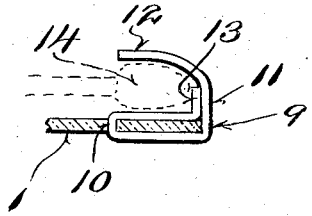
Figure 4 is an enlarged sectional view on the line 4—4 of Figure 1.

A pair of metal clips, indicated generally at 9, are provided for each end of the eye shield, as shown in Figure 1. These clips 9 are of similar construction and are preferably formed from sheet metal. As shown in the enlarged view, Figure 4, the clip has a portion passed through an aperture 10 in the shield member and has a rearwardly extending relatively straight portion 11 provided with an inturned hook 12.

It is to be noted that the portion of the clip passed through the aperture 10 is bent rearwardly, as indicated at 13 and reenforces the straight portion 11.

In using the device, the shield members are preferably slightly separated by pulling outwardly thereon, the elastic loop 5 yielding and permitting this slight separation. Thereafter, the clips 9 are slipped over the spectacle frame, indicated in dotted lines at 14. It is to be noted that these clips are spaced apart and provide ample space for the bows or temples 15 of the spectacles.

It is apparent that the device may be applied with equal facility to nose glasses and in the claims appended hereto, the term "spectacles" will be employed in the most generic sense to cover any of the usual types of spectacles, nose glasses or similar devices.

It will be seen that an extremely cheap, simple and efficacious eye shield has been provided which may be applied quickly and readily to the particular eye glasses employed by the user, which will, therefore, permit the user to have the customary correction of lenses without interference due to the use of the shield.

It will further be seen that the shield may be readily carried by the wearer as it is substantially flat and does not require a large space, and that it may be quickly and readily applied to the spectacles.

Although the invention has been described in considerable detail, it is to be understood that the invention may be variously embodied and is, therefore, to be limited only as claimed.

I claim:

1. An eye shield adapted to be positioned upon a pair of spectacles, said eye shield comprising a pair of transparent colored members, an elastic tape threaded through adjacent portions of said members and having a clip binding the ends of the tape together, and hook-like clips carried by the outer portion of said transparent members and adapted to fit over the spectacles.

2. An eye shield adapted to be positioned upon a pair of spectacles, said eye shield comprising a pair of transparent colored members, an elastic tape threaded through adjacent portions of said members and having a clip binding the ends of the tape together, and hook-like clips carried by the outer portion of said transparent members and adapted to fit over the spectacles, said hook-like clips being arranged in pairs and the clips of each pair being spaced apart.

In testimony that I claim the foregoing I have hereunto set my hand at Milwaukee, in the county of Milwaukee and State of Wisconsin.

ROLAND H. GILKERSON.